Sept. 13, 1932.  J. U. LEMMON, JR  1,876,701
METHOD OF BAKING SAUSAGE ROLLS AND APPARATUS FOR USE THEREWITH
Filed Oct. 21, 1931   2 Sheets—Sheet 1
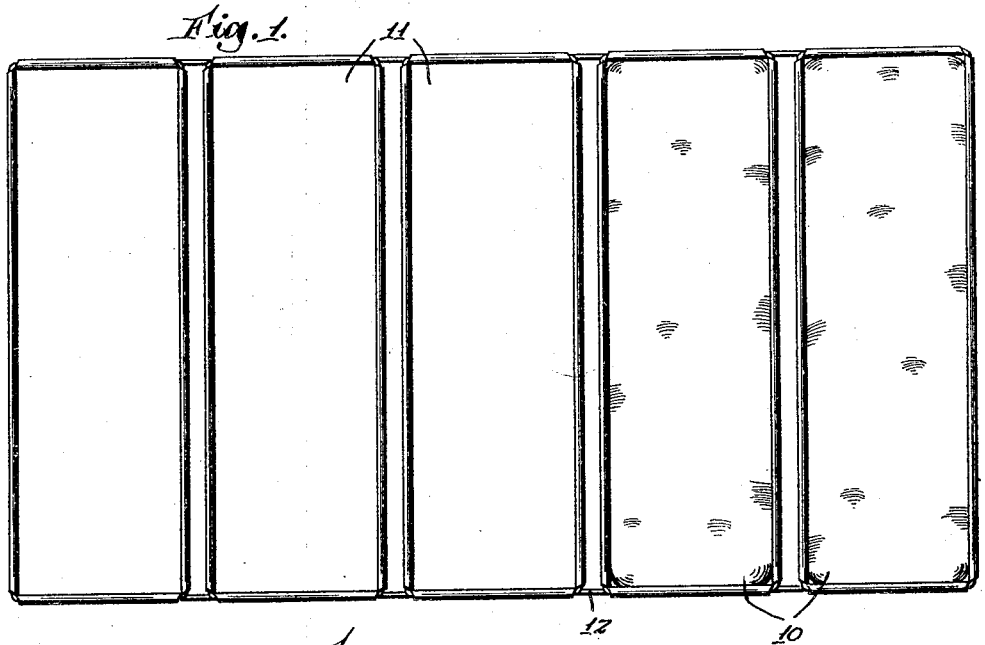
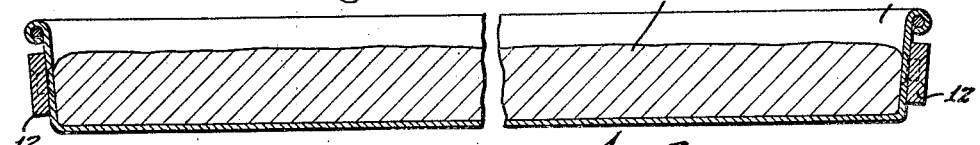
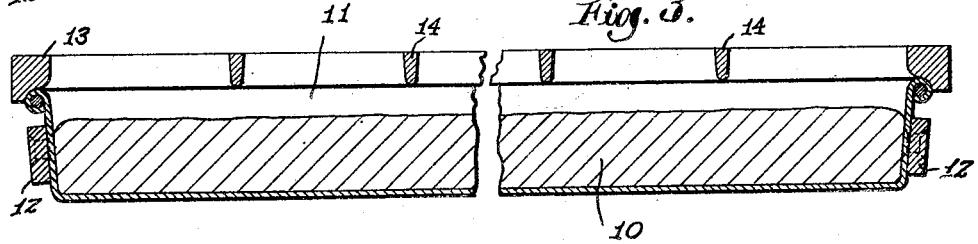
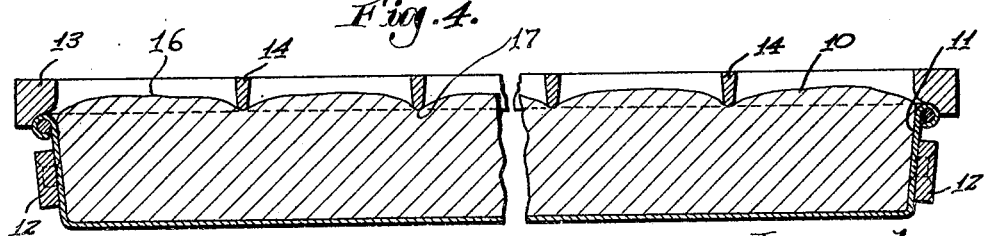
Inventor
John U. Lemmon, Jr.
Harold J. Clark
by Attorney Sept. 13, 1932.   J. U. LEMMON, JR   1,876,701
METHOD OF BAKING SAUSAGE ROLLS AND APPARATUS FOR USE THEREWITH
Filed Oct. 21, 1931   2 Sheets-Sheet 2
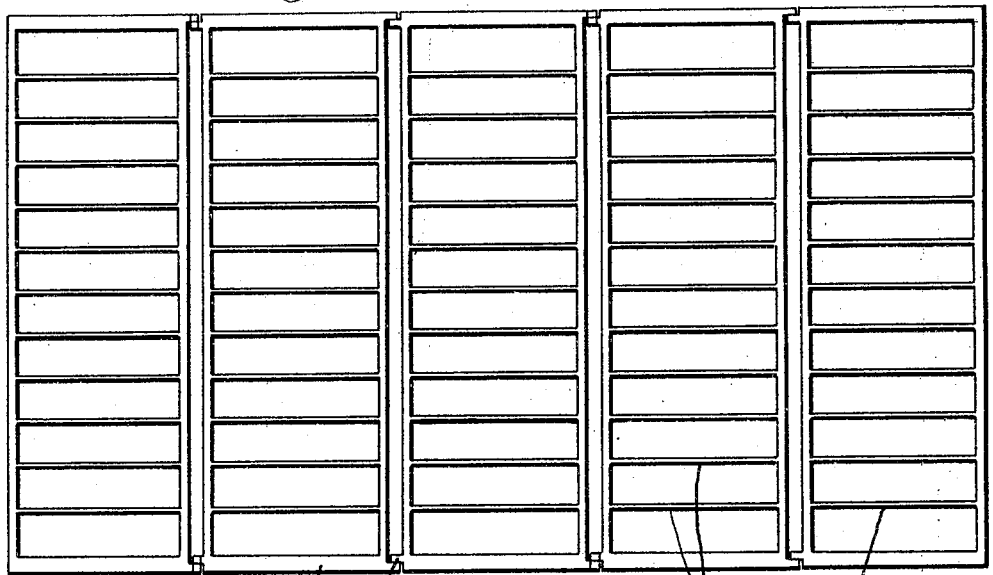
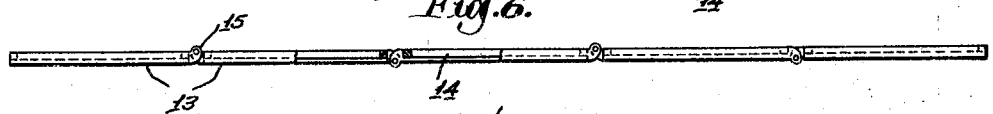
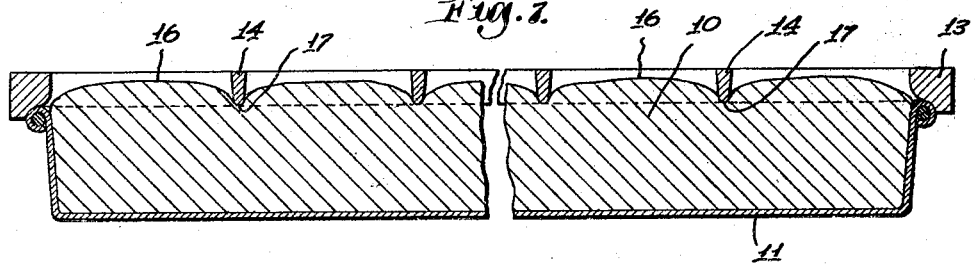
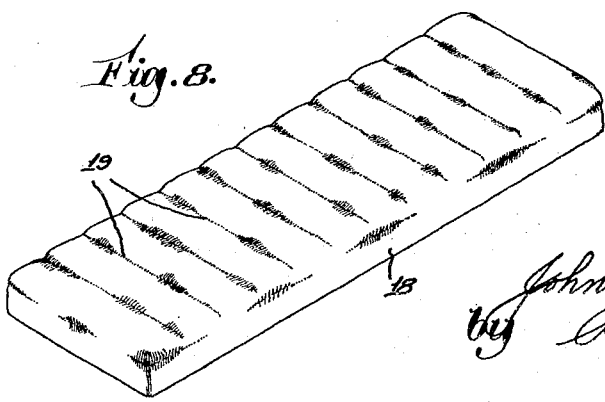

Patented Sept. 13, 1932

1,876,701

UNITED STATES PATENT OFFICE

JOHN U. LEMMON, JR., OF NEWTON, MASSACHUSETTS, ASSIGNOR TO HATHAWAY BAKERIES, INC., OF CAMBRIDGE, MASSACHUSETTS, A CORPORATION OF MASSACHUSETTS

METHOD OF BAKING SAUSAGE ROLLS AND APPARATUS FOR USE THEREWITH

Application filed October 21, 1931. Serial No. 570,063.

My present invention relates to a novel method of baking and forming sausage rolls, and includes a novel apparatus for use in carrying out said process.

An important object of the present invention resides in baking a unitary sheet of roll material and forming or marking the same with suitable lines to indicate the line of separation or division between individual rolls.

Heretofore, in carrying out prior methods of manufacturing sausage rolls in sheet formation, the dough has been kneaded to a predetermined development, and then formed into individual slugs, placed side by side in a suitable pan, proofed and baked. By reason of the individual slugs or pieces comprising the sheet, after the same is baked, said sheet is fragile and difficult to handle, because of the ready separation of the sheet between individual rolls. This prior method has necessitated the employment of skilled high-priced bakers, but is unsatifactory for many reasons. In the first place, it is substantially impossible to attain uniformity between the rolls of a given sheet. Furthermore, when separated from the sheet, the individual rolls presented a further difficulty in the cutting thereof to form a longitudinal filling-receiving recess, requiring that the roll be held by an operator with one hand, usually between the thumb and fingers, and cut with a knife held in the other hand. Furthermore, rolls thus baked and separated, because of the rough surfaces where separated, do not lend themselves to toasting in present-day toasting machines, such as the well known electrical toasters and grills.

In carrying out my present novel method, the dough is first kneaded to the proper development. This is invariably accomplished by mixing and kneading machines. Secondly, the dough, after being kneaded to the proper development, is allowed to stand, for fermenting, and is then molded or sheeted before being placed in a pan, in which pan it is placed as a single sheet or layer.

This operation does not require the use of skilled labor, as will be readily understood, and thus represents a distinct and marked economy at this stage.

The dough thus set in the pan as a single sheet is then placed in the proofing room, where it is proofed for a predetermined interval. At a suitable time, and preferably prior to the proofing step, a marker is placed over the pan, with suitable marking instrumentalities extending transversely of said pan. Thus the dough, during proofing, will rise against the marking devices, and the pressure of said dough against said marking devices will indent said devices in said dough, preferably without, however, breaking or puncturing the skin of said dough, and thus maintaining the dough in each pan as an unbroken unit. The openwork constructon of the marker utilized, permits proofing of the dough without any interference or delay. Then the pan, after proofing, and with the marker still in groove forming position thereon, is placed in the baking oven. The marker remains in place during the baking operation, and forms in the baked sheet, lines, recesses, or grooves, to distinguish and identify the line of separation between individual rolls, and to guide the cutting knife during the step of severance.

By positioning the marker on the pan prior to the proofing of the dough, possible delays and injury or damage to the dough subsequent to proofing and prior to baking, such as falling, are obviated and eliminated. It is feasible, however, to first proof the dough to a predetermined height, preferably not beyond the top of the pan in which it is proofed, then to position the marker on said pan, and then to subject the dough to the baking operation. In this event, the baked or completed sheet of roll materal will have the same characteristics as a sheet in which the marker is positioned before proofing, as will be readily understood and appreciated by those skilled in this art.

The marker utilized in my present invention is entirely open, with the exception of the very slight space occupied by the transverse or lateral indenting devices, thus permitting the full passage of heated air currents around the pan and over the top of the dough, and not interfering in the slightest with the usual and thorough baking thereof. The indenting or marking devices are of such relatively slight mass that they will not interfere with the baking of that slight portion of the dough which is thereunder. Furthermore, by utilizing my novel apparatus and practicing my novel method, absolute uniformity of the divisions of the baked article is assured.

My invention may be practiced with a single pan, or with the customary set of pans, of any desired number, with equal facility, as will be hereinafter more fully explained.

A sheet of roll material baked and marked in accordance with my invention is thus in condition for separation into its individual parts or rolls by the method and with the knife illustrated, described and claimed in my copending application, Ser. No. 570,067, filed Oct. 21, 1931, now Pat. No. 1,847,062.

Other features and objects of the present invention reside in the particular construction of the novel apparatus utilized, and all of the above, together with other objects and features of the invention, the steps of my method, details of construction, advantages and the like, will be hereinafter more fully pointed out, described and claimed.

It will be appreciated and understood that, while I have herein referred to the rolls as sausage rolls, this is a generic term, and includes any roll wherein a longitudinal recess is subsequently formed in the roll for the reception of a filling.

Referring to the drawings, illustrating a preferred embodiment of the present invention, Fig. 1 is a top plan view of a set of pans illustrating, in two of said pans, single sheets of dough preparatory to proofing and baking;

Fig. 2 is a longitudinal sectional view of one of the dough-filled pans, before proofing;

Fig. 3 is a longitudinal sectional view similar to Fig. 2 with my novel marker in groove forming position;

Fig. 4 is a longitudinal sectional view illustrating the proofed dough indented before baking;

Fig. 5 is a top plan view of a multiple marker frame;

Fig. 6 is an end elevation of said marker;

Fig. 7 is a longitudinal sectional view illustrating the completely baked sheet of roll material with the guiding or division grooves or lines permanently formed therein; and Fig. 8 is a perspective view of a sheet of roll material baked and formed in accordance with my novel method.

Referring now to the drawings, for a particular description of the invention, a sheet of dough 10 is placed in a pan 11, after said dough has been kneaded to the proper development and sheeted. The insertion of the sheeted dough 10 in said pan does not require the use of skilled labor, as has heretofore been necessary in the formation and insertion of the individual slugs utilized to produce sausage rolls. When placed in the pan 11, the top of the sheet 10 is considerably below the upper edge of the pan, as will be apparent from a glance at Fig. 2. In quantity production it is, of course, desirable to utilize a set of pans 11, united by bands 12, or in any other desired manner, as illustrated in Fig. 1.

A usual set of pans comprises five, united for handling as a unit. After each of the pans 11 has received its sheet of dough 10, a marker frame 13 is placed over the top of said pan. This frame 13 has a plurality of lateral or transverse webs, wires, or other indenting or marking devices 14. The set of pans is then placed in a proofing room or chamber, where it is proofed or raised for a predetermined time interval, at the expiration of which interval the dough will have risen in the pan to substantially the height illustrated in Fig. 4, that is, above the bottom of the devices 14, as illustrated at 16. The pressure of the dough, during proofing, will indent the devices 14 therein in the manner illustrated, without, however, breaking or puncturing the skin surrounding the said dough, said dough being depressed below said markers, as shown at 17.

When utilizing a set of pans as illustrated in Fig. 1, I may utilize a multiple marker frame, illustrated in Figs. 5 and 6, comprising the individual frame sections 13 hinged at 15, for convenience in handling and storing when not in use. The pan 11, or set of pans, with the marker frame or frames in position, is then placed in an oven, where it is left for the predetermined interval necessary to complete thorough baking thereof.

It will be readily apparent that the presence of the indenting elements 14 will not interfere with the passage of the heated air around the pan 11 and dough 10, so that the baking of said dough will be carried out as readily as without the markers. Also, the mass of the elements 14 is such that the same will readily heat and not interfere with the baking of the dough along the lines 17.

When the baking operation is completed, there is produced a single unitary sheet 18 of roll material, provided with guiding or dividing lines 19, to indicate the line of separation or division of the individual sausage rolls, preferably in accordance with the method defined in my said copending application.

The sheet 18 is strong, and will not have the tendency to break or separate along the lines 19, as would be the case if the sheet 18 were composed of a plurality of individual slugs baked together. A sheet of roll material thus prepared, will therefore retain its freshness for a greater length of time than a sheet prepared under prior methods. Also, when severing a roll from said sheet, there will not be a tendency to separate along the other lines of division, as has heretofore been the fact. Thus a sheet of roll material baked in accordance with my invention, need not be accorded the delicate handling heretofore required with sheets of roll material manufactured in accordance with prior practices. This advantage will also be appreciated at every point of handling subsequent to the baking step. For example, in machine-wrapping sheets of roll material formed in accordance with my invention, the operators will experience no difficulty in handling the same, as each sheet is a unitary, homogeneous mass, instead of being composed of a plurality of individual units in accordance with the prior practice. Also in boxing, crating, shipping, delivery, and all subsequent handling, the advantages of a single unit sheet will be apparent and evidenced.

While I have herein described the step of positioning the marker on the pan as taking place prior to the proofing operation, it will be understood and appreciated that in some instances, with certain types of dough, it will be feasible to practice this step between the proofing and baking operations. In other words, with certain types of dough, the marker could be positioned subsequent to the proofing, but to avoid any possible delays or damage at this important point, it is preferable, as a general rule, to position the marker before proofing.

However, it will be readily apparent to those skilled in this art that the placing of a suitable marker frame after proofing and before baking is within the scope of my present invention.

The simplicity, economy, efficiency and other advantages of my novel method and apparatus, will be instantly apparent to and appreciated by those skilled in this art.

I believe that the method of baking sausage rolls, as above briefly described, is novel, and have therefore claimed the same broadly in this application.

I also believe that the marking or indicating apparatus illustrated herein and above described is novel, and have therefore claimed said apparatus herein.

While I have necessarily described my present invention somewhat in detail, it will be appreciated that I may vary the size, shape, and arrangement of parts within reasonably wide limits, without departing from the spirit of the invention.

My invention is further described and defined in the form of claims as follows:

1. The method of forming a pan of sandwich rolls which consists in placing a sheet of dough in a pan with the depth of the sheet substantially uniform throughout its area, supporting an open-work dough marking frame on the pan above the dough, proofing the dough over a suitable period of time to cause the dough to rise and to be indented by the overlying marking frame, and then baking the pan of proofed and marked dough while the marking frame remains in position indenting the dough.

2. The method of forming a pan of sandwich rolls which consists in placing a unitary sheet of dough in a pan, supporting an open-work dough marking frame above the dough so that as the dough rises the top of the sheet is indented by the marking frame to divide the sheet into separate roll sections, and baking the pan of dough while the open-work marking frame remains in position overlying the dough whereby the indentations are maintained in the sheet during baking and whereby the oven heat is permitted to circulate freely over the top of the sheet to bake and to brown the tops of the roll sections.

3. Means for forming a sheet of sandwich rolls comprising a pan, and an open-work marking frame to be supported on the pan at a level to indent the top of a sheet of dough disposed within the pan as the dough rises, said marking frame being adapted to remain on the pan during baking of the dough and having a plurality of dough indenting elements disposed in spaced relationship to divide the dough into separate sandwich sections, the pan being uncovered except by said dough indenting elements whereby hot oven air is permitted to circulate freely over the top of the dough to bake and to brown the tops of the roll sections, the marking frame being separate from the pan and loose with respect thereto for ready application to and removal from the pan, and means at the margin of the frame for cooperation with the rim of the pan to predetermine the same correct operative positioning of the frame on the pan whenever the frame is applied to the pan, said means being effective to hold the frame against lateral movement in all directions relative to the pan.

4. Means for forming a sheet of sandwich rolls comprising a pan of a width corresponding to the length of the rolls and of a length corresponding to the width of a plurality of rolls, and an open-work marking frame to be supported on the pan at a level to indent the top of a sheet of dough disposed within the pan as the dough rises, said marking frame being adapted to remain on the pan during baking of the dough and having a plurality of dough indenting elements extending transversely of the pan in individual roll width spaced relationship, the pan being uncovered except by said dough indenting elements whereby hot oven air is permitted to circulate freely over the top of the dough to bake and to brown the tops of the rolls, the marking frame being separate from the pan and loose with respect thereto for ready application to and removal from the pan, and means at the margin of the frame for cooperation with the rim of the pan to predetermine the same correct operative positioning of the frame on the pan whenever the frame is applied to the pan, said means being effective to hold the frame against lateral movement in all directions relative to the pan.

In testimony whereof, I have signed my name to this specification.

JOHN U. LEMMON, Jr.